US012553350B2

(12) United States Patent
LaFemina et al.

(10) Patent No.: US 12,553,350 B2
(45) Date of Patent: Feb. 17, 2026

(54) COMBINED TIP FLAG BLADE CORE

(71) Applicant: RTX Corporation, Farmington, CT (US)

(72) Inventors: Skyler A. LaFemina, Commack, NY (US); Brandon W. Spangler, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/582,118

(22) Filed: Feb. 20, 2024

(65) Prior Publication Data

US 2025/0264025 A1 Aug. 21, 2025

(51) Int. Cl.
*F01D 5/18* (2006.01)

(52) U.S. Cl.
CPC ............. *F01D 5/187* (2013.01); *F01D 5/186* (2013.01); *F05D 2240/307* (2013.01); *F05D 2250/185* (2013.01); *F05D 2260/20* (2013.01); *F05D 2260/201* (2013.01); *F05D 2260/202* (2013.01)

(58) Field of Classification Search
CPC .......... F01D 5/186; F01D 5/187; F01D 5/188; F01D 5/189; F01D 9/065; F05D 2240/307; F05D 2260/20; F05D 2260/201; F05D 2260/202; F05D 2250/185
See application file for complete search history.

(56) References Cited

U.S. PATENT DOCUMENTS

| | | | | |
|---|---|---|---|---|
| 4,753,575 A | | 6/1988 | Levengood et al. | |
| 5,403,159 A | | 4/1995 | Green et al. | |
| 6,168,381 B1 | * | 1/2001 | Reddy | F01D 5/186 416/97 R |
| 7,186,082 B2 | * | 3/2007 | Mongillo, Jr. | F01D 5/187 416/97 R |
| 7,210,906 B2 | * | 5/2007 | Papple | F01D 5/187 416/97 R |
| 7,665,968 B2 | * | 2/2010 | Mongillo, Jr. | F01D 5/187 416/97 R |
| 10,502,067 B2 | | 12/2019 | Mongillo et al. | |
| 2003/0026698 A1 | * | 2/2003 | Flodman | F01D 5/186 416/97 R |

(Continued)

FOREIGN PATENT DOCUMENTS

| | | | |
|---|---|---|---|
| EP | 1510653 A2 | * | 3/2005 |
| EP | 1820937 B1 | | 1/2020 |
| EP | 4321731 A2 | | 2/2024 |

OTHER PUBLICATIONS

English machine translation of EP-1510653-A2, Sep. 18, 2024.*
Extended European Search Report for EP Application No. 24222647.0, dated Jun. 4, 2025, 11 pages.

*Primary Examiner* — Christopher Verdier
(74) *Attorney, Agent, or Firm* — Kinney & Lange, P.A.

(57) ABSTRACT

A cooling circuit of an airfoil for a gas turbine engine includes a serpentine channel having a plurality of fluidly connected radially extending flow passages and a tip flag channel disposed adjacent to the serpentine channel. The tip flag channel includes a first tip flag passage extending radially and a second tip flag passage extending axially from a terminal end of the first tip flag passage, the second tip flag passage disposed radially outward of the serpentine channel. The second tip flag passage is in direct fluid communication with each of the first tip flag passage and a final passage of the serpentine channel.

16 Claims, 6 Drawing Sheets

(56) References Cited

U.S. PATENT DOCUMENTS

| | | | | |
|---|---|---|---|---|
| 2005/0084370 | A1 | 4/2005 | Gross | |
| 2015/0204197 | A1 * | 7/2015 | Lee ......................... | F01D 5/187<br>416/97 R |
| 2016/0354953 | A1 * | 12/2016 | Auxier .................... | B23P 6/007 |
| 2018/0298763 | A1 | 10/2018 | Lee et al. | |

* cited by examiner

COMBINED TIP FLAG BLADE CORE

STATEMENT OF GOVERNMENT INTEREST

This invention was made with government support under Contract No. N00019-21-G-0005 awarded by United States Air Force. The government has certain rights in the invention.

BACKGROUND

The present invention relates generally to cooling components of gas turbine engines and, more particularly, to airfoil cooling circuits.

A gas turbine engine may include a turbine section with multiple rows or stages of stator vanes and rotor blades that interact or react with a high temperature gas flow to create mechanical power. The efficiency of the engine can be increased by passing a higher temperature gas flow through the turbine. However, the turbine inlet temperature is limited to the vane and blade (airfoils) material properties and the cooling capabilities of the airfoils. Hollow airfoils of a turbine section include internal cooling circuits or cores configured to achieve a higher cooling effectiveness and to reduce airfoil metal temperatures. A blade core design that reduces cooling air heat pick-up and increases the internal heat transfer coefficient without compromising back flow margin is desirable. This is of particular interest in the tip region of a blade where gas path temperatures are generally the hottest. Blade tips encompass a relatively large mass of hot metal, often experience thermal mechanical fatigue cracks due to mismatch between outboard airfoil wall thickness and a tip cap thickness, and are difficult to cool due to poor film cooling attachment in the tip region. Another area of interest is the last passage of a serpentine cooling channel, which typically ends in a dead-end and has low flow and internal heat transfer as a result. Serpentine tip turns and the last passages of dead-ended serpentine cooling channels do not provide good heat transfer due to flow separation and low flow rate and/or flow separation, respectively. An axially extending tip flag cavity disposed at a tip of the blade helps reduce heat pickup throughout the serpentine channel by reducing the length the cooling fluid travels. A dedicated tip flag has the added benefit of providing cool air to the tip of the blade but does not solve the shortfalls of a dead-ended serpentine cavity.

New cooling circuit designs are needed to enable higher internal heat transfer in the last passage of a serpentine cooling channel while providing relatively cool tip temperatures.

SUMMARY

An airfoil for a gas turbine engine, configured to extend in a radial direction relative to an engine axis from an inner diameter to an outer diameter, includes a body and a cooling circuit disposed in the body. The body has a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip. The cooling circuit includes a serpentine channel having a plurality of radially extending passages connected in flow series from a first passage to a final passage and a tip flag channel disposed adjacent to the serpentine channel. The tip flag channel includes a first tip flag passage disposed adjacent to the final passage of the serpentine channel and extending radially, and a second tip flag passage disposed between the serpentine channel and the tip and extending axially from the first tip flag passage and disposed direct fluid communication with each of the first tip flag passage and the final passage of the serpentine channel.

A cooling circuit of an airfoil for a gas turbine engine includes a serpentine channel having a plurality of fluidly connected radially extending flow passages and a tip flag channel disposed adjacent to the serpentine channel. The tip flag channel includes a first tip flag passage extending radially and a second tip flag passage extending axially from a terminal end of the first tip flag passage, the second tip flag passage disposed radially outward of the serpentine channel. The second tip flag passage is in direct fluid communication with each of the first tip flag passage and a final passage of the serpentine channel.

The present summary is provided only by way of example, and not limitation. Other aspects of the present disclosure will be appreciated in view of the entirety of the present disclosure, including the entire text, claims, and accompanying figures.

Figure 1:
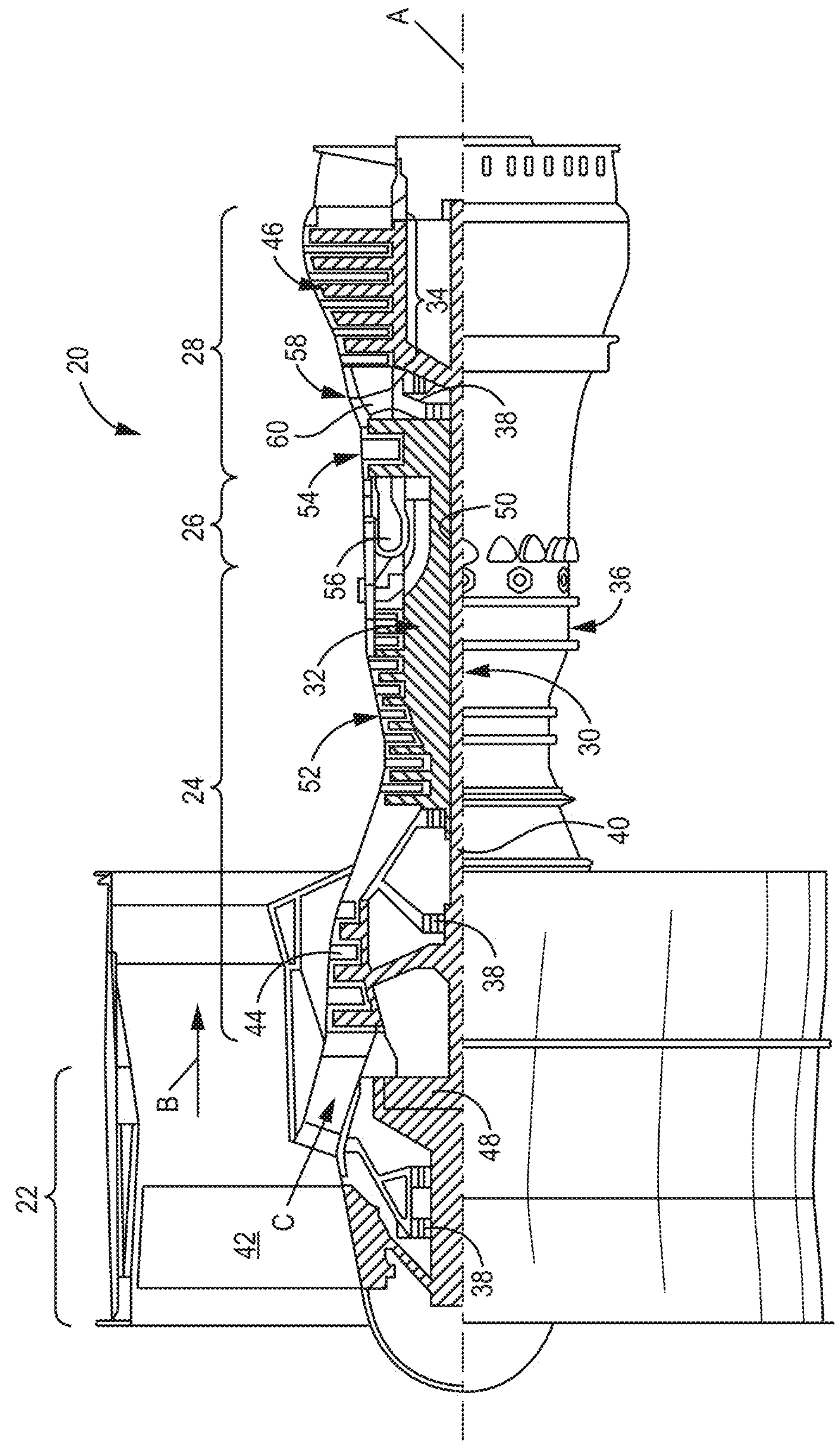
FIG. 1 is a quarter-sectional view of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a quarter-sectional view of gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

As used herein, "aft" refers to the direction associated with the exhaust (e.g., the back end) of a gas turbine engine. As used herein, "forward" refers to the direction associated with the intake (e.g., the front end) of a gas turbine engine. As used herein, "aft" and "forward" refer to axial positions relative to an engine central longitudinal axis. As used herein, "radially outward" and "radial inward" refer to radial positions relative to the engine central longitudinal axis.

Example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Each of the compressor section 24 and the turbine section 28 can include alternating rows of rotor assemblies and vane assemblies (shown schematically) that carry airfoils that extend into the core flow path C. To improve efficiency, static outer shroud seals (shown in FIG. 2), such as a blade outer air seal (BOAS), can be located radially outward from rotor airfoils to reduce tip clearance and losses due to tip leakage.

Figure 2:
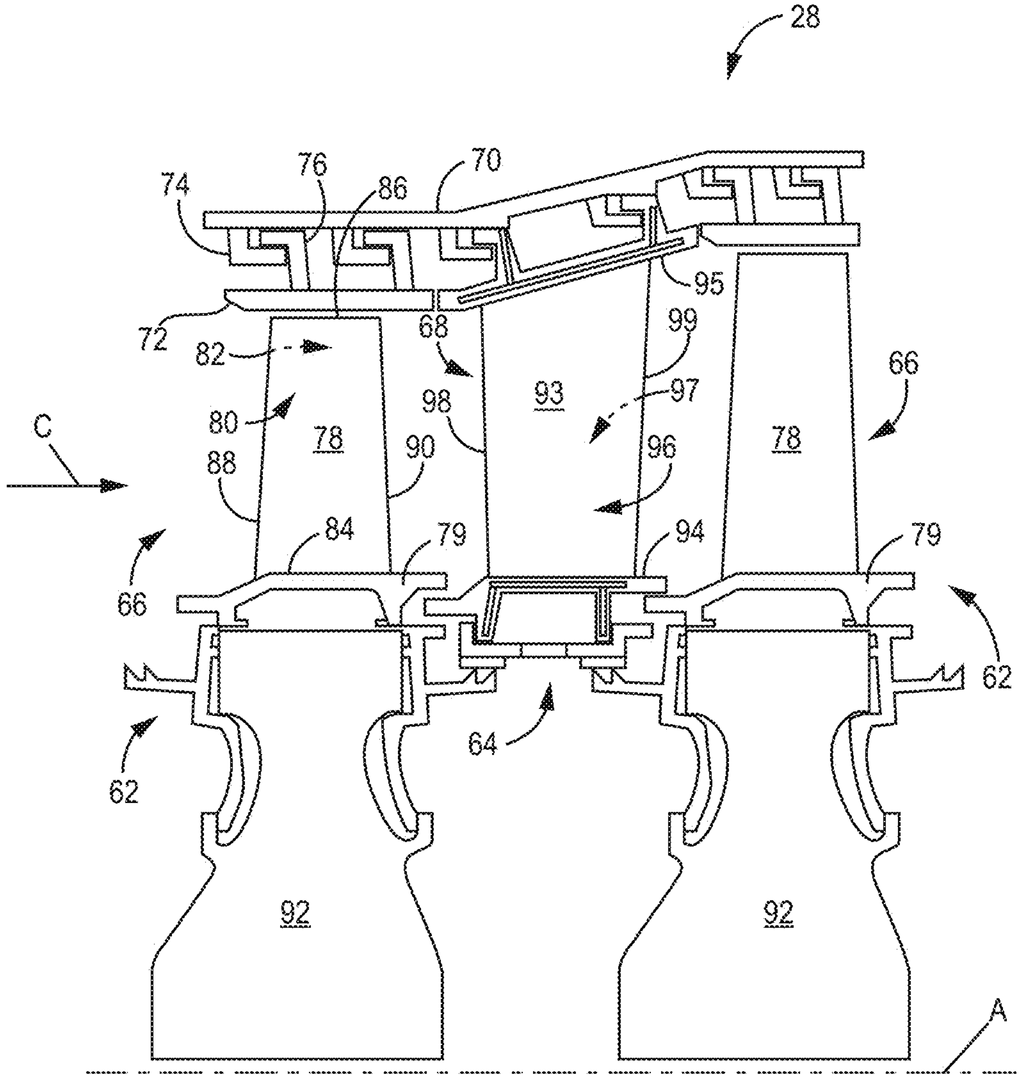
FIG. 2 is a schematized cross-sectional view of a turbine section of the gas turbine engine of FIG. 1.

FIG. 2 is a schematic view of a portion of turbine section 28 that may employ various embodiments disclosed herein. Turbine section 28 includes alternating rows of rotor assemblies 62 and vane assemblies 64. Rotor assemblies 62 include a plurality of rotor blades 66 that extend into core flow path C. Vane assembly 64 includes a plurality of stationary vanes 68 that extend into core flow path C. Turbine section 28 is housed within a case 70, which can include multiple parts (e.g., turbine case, diffuser case, etc.). In various locations, components, such as seals, may be positioned between blades 66, vanes 68, and case 70. For example, BOAS 72 are located radially outward from blade 66. BOAS 72 can include BOAS supports that are configured to fixedly connect or attach BOAS 72 to case 70. For example, case 70 can include a plurality of hooks 74 that engage with BOAS hooks 76 to secure the BOAS 72 between case 70 and a tip of blade 66.

Blades 66 include airfoil 78 and platform 79. Airfoil body includes pressure side wall 80, suction side wall 82, base region 84, tip 86, leading edge 88, and trailing edge 90. Pressure side wall 80 is disposed opposite suction side wall 82. Pressure side wall 80 and suction side wall 82 each extend radially from base region 84 toward tip 86. As used herein, the term "radial" refers to an orientation perpendicular to engine axis A. Pressure side wall 80 and suction side 82 each extend generally axially and/or tangentially (e.g., with respect to engine axis A) between leading edge 88 and trailing edge 90. Each of base region 84 and tip 86 extend from leading edge 88 to trailing edge 90 at an innermost radial extent and an outermost radial extent of airfoil 78, respectively. Platform 79 joins airfoil 78 at base region 84. Platform 79 forms an inner boundary of core airflow C. Blades 66 are joined to rotor disks 92. Each bade 66 can include a root portion (not shown) received in rotor disk 92.

Vanes 68 include airfoil body 93, inner diameter platform 94, and outer diameter platform 95. Airfoil body 93 includes pressure side wall 96, suction side wall 97, leading edge 98, and trailing edge 99. Airfoil 93 extends radially from inner diameter platform 94 to outer diameter platform 95. Inner and outer diameter platforms 94, 95 form inner and outer boundaries for core airflow C.

Blades 66 and vanes 68 are hollow bodies with internal cavities. Internal cavities can include one or more cooling circuits defined by a plurality of channels and flow passages configured to direct a cooling fluid. The channels can be separated by walls disposed in the internal cavity. Walls can extend, for example, radially or in a spanwise direction between base region 84 and tip 86 of blades 66, joining pressure side wall 80 and suction side wall 82 to form radially extending channels. Walls can extend a full or partial radial span of airfoils 78 and 93. Walls can additionally or alternatively extend axially or in a chordwise direction between leading edge 88 and trailing edge 90 of blade 66, joining pressure side wall 80 and suction side wall 82 to form axially extending channels. Channels can be fluidly connected via turns or crossover holes through walls to form a cooling fluid flow path through blade 66 or vane 68. Cooling fluid can be provided to the internal cavity of blades 66 via one or more openings in a base of blade 66 (e.g., through a root of the blade). A cooling fluid supply channel can extend through disk 92 and a root of blade 66 to deliver cooling fluid to the internal cooling circuit. Cooling fluid can be provided to the internal cavity of vanes 68 via one or more openings in outer diameter platform 98.

FIGS. 3-6 are cross-sectional views of alternative embodiments of a cooling circuit for an airfoil of a gas turbine engine. The cooling circuits of FIGS. 3-6 are configured to enable higher internal heat transfer in a final passage of a serpentine channel and relatively cool tip temperatures. This is achieved by providing a dedicated tip flag channel fluidly connected to the final passage of the serpentine channel and a metering orifice that connects a radially extending passage of the tip flag channel disposed adjacent to and forward of the serpentine channel to an axially extending passage of the tip flag channel. The axially extending passage of the tip flag channel provides a low-pressure sink and a location for cooling holes downstream of the last passage of the serpentine channel. The reduced pressure and cooling holes can pull additional fluid flow through and increase heat transfer in the serpentine channel, which, in turn, helps reduce a creep critical section average temperature. The metering orifice provides a pressure drop to encourage fluid flow from the radially extending passage of the tip flag channel axially aft through the axially extending passage of the tip flag channel as opposed to radially inward through a portion of the final passage of the serpentine channel.

FIGS. 3-6 illustrate cooling circuits for a rotor blade (e.g., blade 66) of a gas turbine engine. It will be understood by one of ordinary skill in the art that the disclosed cooling circuits may be similarly implemented in a stator vane.

Figure 3:
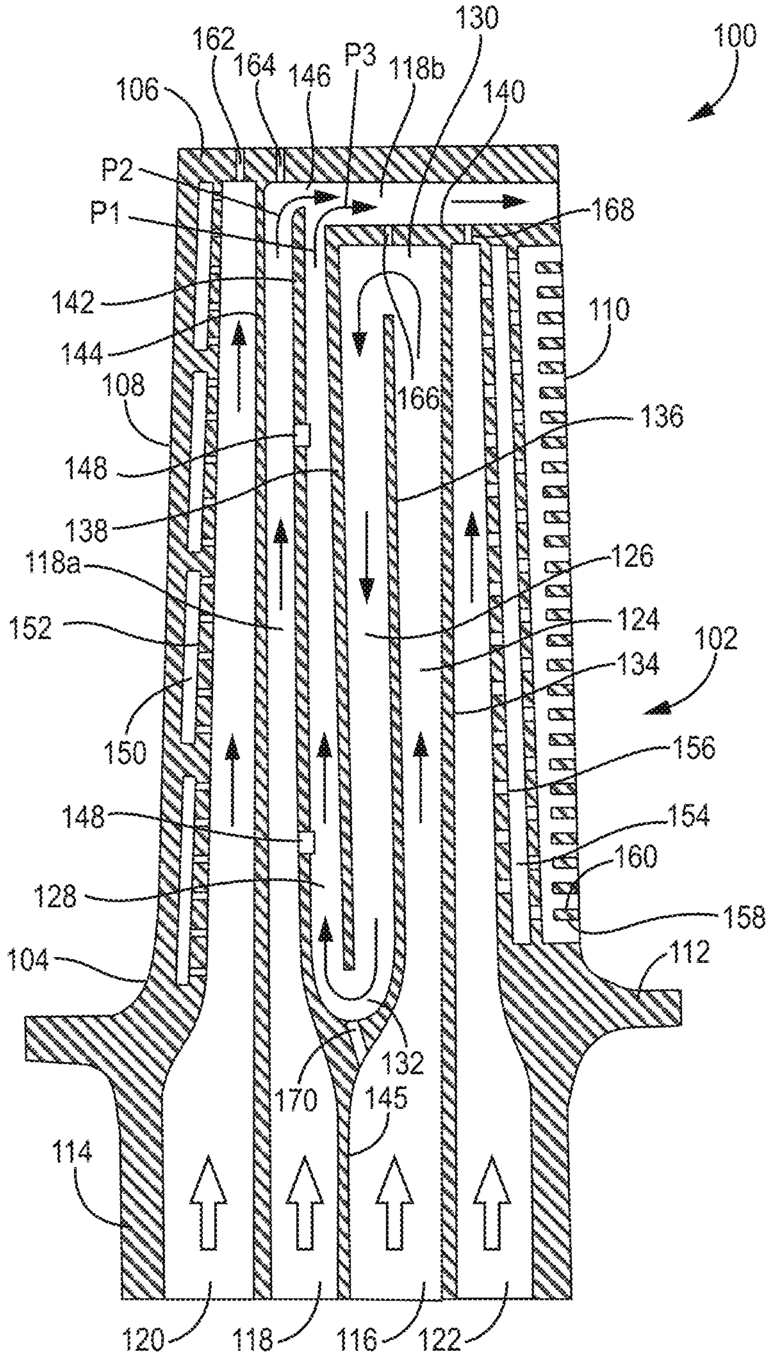
FIG. 3 is a cross-sectional view of one embodiment of an airfoil of the turbine section of FIG. 2 having an axial metering hole connecting a radially extending passage to an axially extending passage of a tip flag cooling channel.

FIG. 3 shows blade 100. Blade 100 includes airfoil body 102. Airfoil body 102 extends from base region 104 to tip 106 and from leading edge 108 to trailing edge 110. Airfoil body 102 includes a pressure side wall and an oppositely disposed suction side wall (not shown) as described with respect to FIG. 2. Airfoil body 102 joins platform 112 at base region 104. Platform 112 forms an inner boundary of core airflow C (shown in FIG. 2). Blade 100 can be joined to a rotor disk (i.e., disk 92, FIG. 2) by root portion 114, which can be received in a corresponding slot (not shown) in the rotor disk.

Blade 100 has an internal cooling circuit including serpentine channel 116 and an adjacent and fluidly connected tip flag channel 118. Blade 100 can additionally include leading edge channel 120 and trailing edge channel 122. Each of serpentine channel 116, tip flag channel 118 (including radially extending passage **118*a* and axially extending passage 118*b*), leading edge channel 120, and trailing edge channel 122 can have an inlet disposed in root portion 114** configured to receive a cooling airflow.

Serpentine channel 116 is a forward flow channel and includes a plurality of radially extending passages 124, 126, 128 connected in flow series by end turns 130, 132. Passages 124, 126, 128 and end turns 130, 132 are defined between walls 134, 136, 138, 140 and 142, which connect suction and pressure side walls. A first passage 124 extends radially outward from an inlet at a base of root portion 114 to wall 140. Wall 140 extends axially. Wall 140 defines a radially inner boundary of a portion of axially extending passage **118*b* of tip flag channel 118 as described further herein and a radially outer boundary of first passage 124, second passage 126, and end turn 130. First passage 124 is an up pass through which cooling fluid is directed from the inlet at root portion 114 radially outward. First passage 124 is defined between radially extending walls 134 and 136. Radially extending wall 134 extends from root portion 114 to wall 140, joining wall 140. Wall 134 defines an aftmost boundary of serpentine channel 116. Wall 134 can be solid to confine the cooling flow to serpentine channel 116**.

A second passage 126 of serpentine channel 116 is disposed adjacent to and forward of first passage 124. Second passage 126 is fluidly connected to first passage 124 by end turn 130 and defined between radially extending walls 136 and 138. End turn 130 is defined between radially extending walls 134 and 138 and axially extending wall 140, which are configured to turn a cooling flow 180 degrees between first passage 124 and second passage 126. Each of walls 134 and 138 joins wall 140 to define end turn 130 therebetween. Second passage 126 is a down pass through which cooling fluid is directed radially inward from wall 140 toward root portion 114. Second passage 126 can extend into base region 104 of airfoil body 102 as shown in FIG. 3. Wall 136 can be curved to define a portion of end turn 132 in base region 104. Wall 136 extends radially outward from base region 104 toward wall 140. Wall 136 is radially separated from wall 140 to provide end turn 130.

A final passage 128 of serpentine channel 116 is disposed adjacent to and forward of second passage 126. Final passage 128 is fluidly connected to second passage 126 by end turn 132 and defined between radially extending walls 138 and 142. Walls 136 and 142 can join at a radially inner end to form end turn 132, which is configured to turn a cooling flow 180 degrees between second passage 126 and final passage 128 of serpentine channel 116. Walls 136 and 142 can join to form a curved profile at end turn 132 to promote the redirection of cooling flow. Walls 136 and 142 can join wall 145 radially inward of end turn 132. Wall 145 extends to root portion 114 and separates serpentine channel 116 from tip flag channel 118. Final passage 128 is an up pass through which cooling fluid is directed radially outward from end turn 132 toward tip 106. Final passage 128 opens to axially extending passage **118*b* of tip flag channel 118 at a radially outermost extent to direct cooling flow from serpentine channel 116 into tip flag channel 118. An outlet of final passage 128 is defined between walls 142 and 138**, the pressure side wall, and the suction side wall.

As illustrated in FIG. 3, serpentine channel 116 can be disposed in a mid-chord region of airfoil body 102 to provide cooling thereto. Serpentine channel 116 extends radially outward from base region 104 to axially extending passage **118*b* of tip flag channel 118 to cool a span of airfoil body 102 extending between base region 104 and axially extending passage 118*b* of tip flag channel 118. Cooling flow (illustrated by arrows) exiting final passage 128 can have a pressure P1. Cooling flow through serpentine channel 116 increases in temperature and drops in pressure between the inlet in root portion 114 and outlet in final passage 128. Serpentine channel 116 is radially separated from tip 106 by axial tip flag channel 118*b*, which locates low heat transfer end turn 130 away from tip 106, which improves tip cooling. Serpentine channel 116 does not extend a full span of airfoil body 102 and is thereby shorter in length than some prior art designs. Reducing the length of serpentine channel 116** reduces cooling air heat pick-up, which can improve the life of the blade at creep critical sections (usually between 30% and 60% of the span).

Tip flag channel 118 is disposed immediately adjacent to serpentine channel 116. Tip flag channel 118 can provide dedicated cooling flow to tip 106 by conveying cooling flow directly from an inlet in root portion 114 to tip 106. Tip flag channel 118 includes radially extending passage 118*a* and axially extending passage 118*b*. Radially extending passage 118*a* is disposed immediately adjacent to final passage 128 of serpentine channel 116 and is defined by walls 142 and 144, the pressure side wall, and the suction side wall. Radially extending passage 118*a* extends from an inlet in root portion 114 toward tip 106. Radially extending passage 118*a* can extend fully to tip 106. Wall 144 extends from root portion 114 to tip 106 to define a forward boundary of tip flag channel 118. Wall 144 can be solid to separate tip flag channel 118 from a leading edge channel (e.g., leading edge channel 120).

Axially extending passage 118*b* is immediately adjacent to and radially outward of serpentine channel 116. Axially extending passage 118*b* extends aftward from radially extending passage 118*a* to trailing edge 110 and is defined by tip 106, wall 140, the pressure side wall, and the suction side wall. Axially extending passage 118*b* is open to trailing edge 110. The outlet of final passage 128 of serpentine channel 116 opens to axially extending passage 118*b*. Axially extending passage 118*b* provides cooling to tip 106.

Tip flag channel 118 includes metering orifice 146 configured to control cooling flow exiting radially extending passage 118*a* and entering axially extending passage 118*b*. Specifically, metering orifice 146 is configured to reduce the pressure of cooling flow entering axially extending passage 118*b* from radially extending passage 118*a* to promote cooling flow through axially extending passage 118*b* and prevent cooling flow from entering and flowing radially inboard through a portion of final passage 128 of serpentine channel 116. Cooling fluid exiting radially extending passage 118*a* can have a pressure P2. Metering orifice 146 can be configured to reduce pressure P2 to P3 at an outlet of metering orifice 146 and intersection with the outlet of final passage 128 of serpentine channel 116. P3 can be equal to or less than P1 to drive cooling flow axially through tip flag channel 118 and to prevent cooling fluid from being ingested by serpentine cooling channel 116.

Metering orifice 146 is an opening between tip 106 and wall 142 and defined by tip 106, wall 142, the pressure side wall, and the suction side wall. In this embodiment, metering orifice 146 is a slot that fully extends between the pressure side wall and the suction side wall. Metering orifice 146 can be formed by providing radial separation between tip 106 and wall 142. A height of wall 142 can be selected to provide metering orifice 146 with a cross-sectional area needed to provide a desired pressure drop or pressure P3. The distance between wall 142 and tip 106 can vary based on engine and application. A terminal end of wall 142 can be disposed radially outward of wall 140. A radially outermost edge of wall 142 can be curved to promote turning of cooling fluid between radially extending passage 118*a* and axially extending passage 118*b* as illustrated in FIG. 3. In some embodiments, wall 142 can curve with an axially extending component at radially outermost end to direct cooling flow axially and radially outward of the outlet of final passage 128 of serpentine channel 116 and further help prevent cooling flow from entering final passage 128.

During operation, cooling flow is provided to each of serpentine channel 116 and tip flag channel 118 via inlets in root portion 114. Cooling flow in serpentine channel 116 is conveyed forward through airfoil body 102 via first passage 124 (up pass), second passage 126 (down pass), and final passage 128 (up pass) as indicated by cooling flow arrows. Cooling flow is conveyed radially outward through first passage 124, radially inward through second passage 126, and radially outward through final passage 128. Cooling flow is exhausted from airfoil body 102 via axial tip flag channel 118*b*. Cooling flow exiting final passage 128 of serpentine channel 118 is conveyed aftward though axially extending passage 118*b* to trailing edge 110 where cooling flow exits airfoil body 102.

Cooling flow in tip flag channel 118 is conveyed radially outward from root portion 114 through radially extending passage 118*a* to tip 106. Cooling flow is conveyed from radially extending passage 118*a* to axially extending passage 118*b* via metering orifice 146. Metering orifice 146 is sized to reduce a pressure P2 of cooling flow exiting radially extending passage 118*a* to a pressure P3 in axially extending passage 118*b* to promote axial cooling flow through axially extending passage 118*b*. Each of radially extending passage 118*a* and axially extending passage 118*b* are defined in part by tip 106 and thereby provide cooling to tip 106. Radially extending passage 118*a* can also provide cooling of wall 142 and cooling flow through final passage 128 of serpentine channel 116.

In some embodiments, wall 142 separating serpentine channel 116 and tip flag channel 118 can include one or more orifices or crossover holes 148 configured to provide fluid communication between radially extending passage 118*a* and final passage 128 of serpentine channel 116. Crossover holes 148 can provide additional cooling flow to final passage 128 of serpentine channel 116 and/or can be provided to increase a pressure P1 of final passage 128 at an outlet of final passage 128 or balance the pressure P1 and P2 exiting final passage 128 and radially extending passage 118*a* of tip flag channel 118. Inclusion of one or more crossover holes 148 can influence the design or cross-sectional area of metering orifice 146 needed to provide pressure P3. Crossover holes 148 can be defined within wall 142 and can be centrally located between the pressure side wall and the suction side wall or can be biased toward one of the pressure side wall or suction side wall to provide desired cooling. Crossover holes 148 can be disposed at any location along a length of final passage 128 suitable for providing improved cooling, increased pressure in final passage 128, and/or structural stability. In some embodiments, it may be necessary to provide one or more crossover holes 148 as core ties to connect a tip flag channel core and a serpentine channel core in a casting process in the manufacture of blade 100. Use of core ties reduces undesirable movement and part breakage during the manufacturing process.

Leading edge channel 120 can be disposed adjacent to and forward of tip flag channel 118. Leading edge channel 120 can extend radially outward from an inlet in root portion 114 to tip 106. Leading edge channel 120 can be fluidly coupled to a plurality of leading edge boxcar cavities 150 via crossover holes 152. Boxcar cavities 150 can be disposed along leading edge 108 between base region 104 and tip 106 of airfoil body 102. Leading edge channel 120 can provide direct cooling of tip 106 at a radially outermost end of leading edge channel 120 and can provide indirect cooling of tip 106 via a boxcar cavity 150 disposed adjacent to tip 106. Leading edge channel 120 can have other configurations and is not limited to the configuration shown. In some embodiments, tip flag channel 118 may provide cooling to leading edge 108. Cooling flow through leading edge channel 120 can be discharged through tip 106 and cooling holes through airfoil body 102 (e.g., cooling holes connecting boxcar cavities 150 to an exterior surface of airfoil body 102).

Trailing edge channel 122 can be disposed adjacent to and aft of serpentine channel 116 and, specifically, immediately adjacent to and aft of first passage 124. Trailing edge channel 122 can extend from an inlet in root portion 114 to wall 140, forming a radially inner boundary of tip flag channel 118. Trailing edge channel 122 is configured to provide cooling to trailing edge 110. Trailing edge channel 122 is fluidly coupled to trailing edge 110. Trailing edge channel 122 may be fluidly coupled to one or more trailing edge cavities or passages 154 via crossover holes 156. Cooling fluid can be exhausted from trailing edge channel 122 via trailing edge slots 158 defined between axially extending trailing edge ribs 160. Trailing edge channel 122 and trailing edge cooling features are not limited to the structures shown.

One or more core ties 162, 164, 166, and 168 may be provided to help position cooling channel cores (e.g., leading edge channel 120, tip flag channel 118, serpentine channel 116, and trailing edge channel 122) during the casting process. Resulting orifices formed by core ties 162, 164, 166, and 168 can purge dirt during operation of the gas turbine engine. Core tie 170 connecting first passage 124 with last passage 128 via end turn 132 can provide core stiffness during the casting process and can provide a bypassed cooling flow from first passage 124 directly to final passage 128 to further cool final passage 128.

Figure 4:
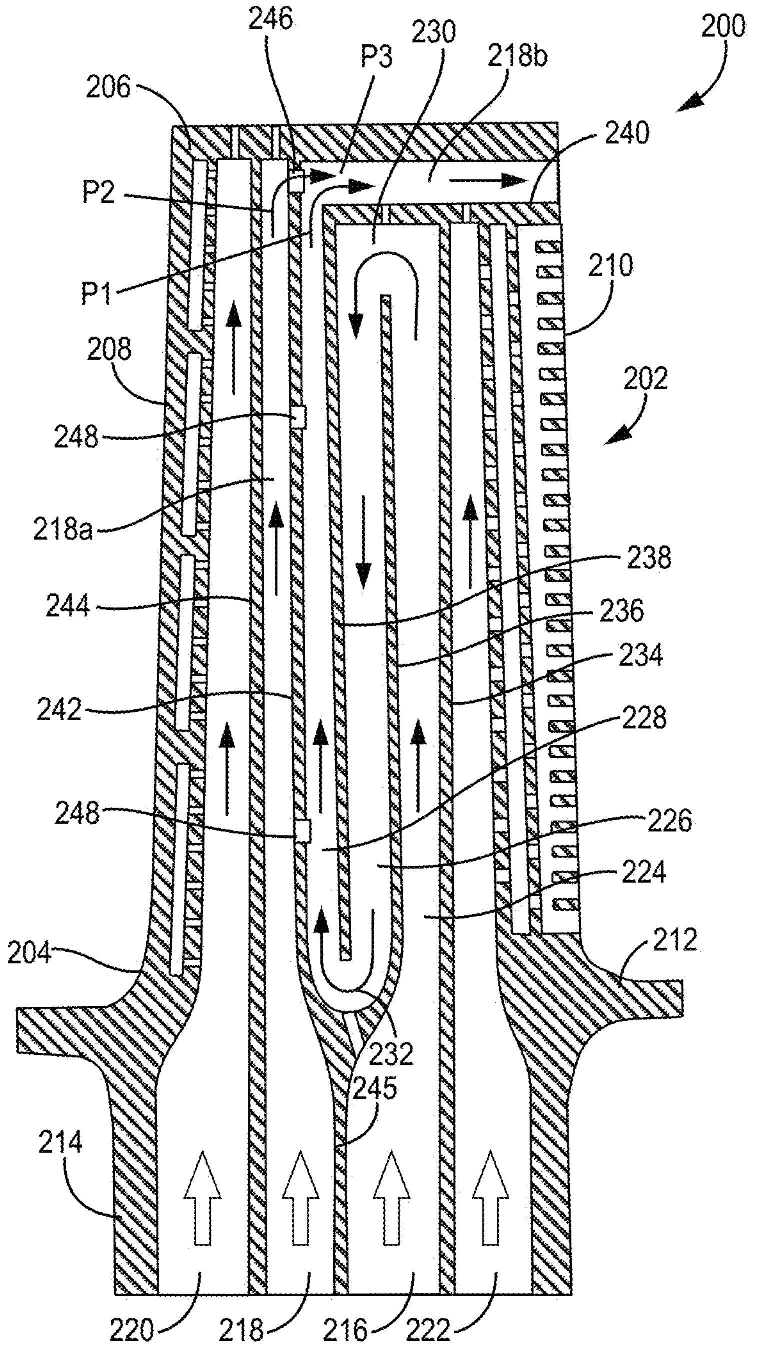
FIG. 4 is a cross-sectional view of another embodiment of an airfoil of the turbine section of FIG. 2 having an axial wall-to-wall metering slot connecting a radially extending passage to an axially extending passage of a tip flag cooling channel.

FIG. 4 is a cross-sectional view of blade 200. Blade 200 is substantially similar to blade 100 with a variation in the configuration of a metering orifice connecting the radially extending passage of the tip flag channel to the axially extending passage of the tip flag channel. Airfoil body 202, base region 204, tip 206, leading edge 208, trailing edge 210, platform 212, root portion 214, serpentine channel 216, tip flag channel 218 (including radially extending passage **218*a* and axially extending passage 218*b*), leading edge channel 220, trailing edge channel 222, first passage 224, second passage 226, final passage 228, end turns 230 and 232, walls 234, 236, 238, 240, 242, 244, and 245, metering orifice 246, and crossover holes 248 are shown. With the exception of metering orifice 246 and wall 242, all elements are consistent with corresponding elements of blade 100 and described with respect thereto. Reference numbers have been increased by 100 for ease of comparison. Features not labelled are consistent with the corresponding features shown in FIG. 3** and discussed with respect thereto.

As illustrated in FIG. 4, wall 242, which defines an aft boundary of radially extending passage **218*a* of tip flag channel 218, extends fully to tip 206. Metering orifice 246 is a hole through wall 242 disposed between the pressure side wall and the suction side wall. In contrast to metering orifice 146, metering orifice 246 does not fully extend from the pressure side wall to the suction side wall. Metering orifice 246 can be disposed radially inward of tip 206 and radially outward of wall 240 to direct cooling flow into axially extending portion 218*b* of tip flag channel 218. Metering orifice 246 can be centered radially between tip 206 and wall 240 and/or can be centered between the pressure side wall and the suction side wall. In some embodiments, metering orifice 246 may be biased toward tip 206 or wall 240 and/or toward the pressure side wall or the suction side wall. Metering orifice 246 can have a circular cross-sectional shape or any shape suitable for conducting cooling flow. Metering orifice 246 has a cross-sectional area selected to provide a reduction in pressure from P2 to P3 to promote axially directed cooling flow through axially extending passage 218*b* of tip flag channel 218 and to discourage cooling flow exiting metering orifice 246 from entering final passage 228 of serpentine channel 216 and being conveyed inboard through a portion of final passage 228. Metering orifice 246** can be shaped and oriented in various configurations to provide desired flow and temperature benefits.

Figure 5:
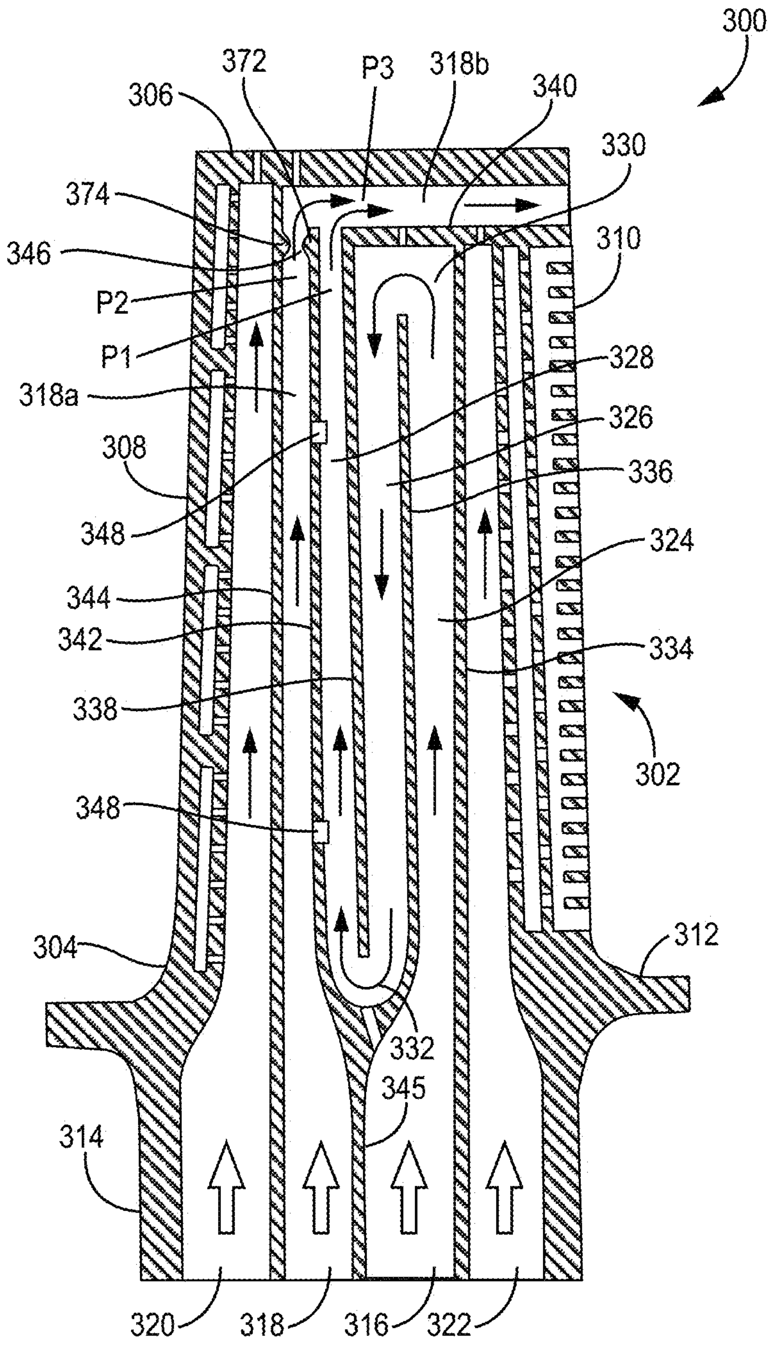
FIG. 5 is a cross-sectional view of yet another embodiment of an airfoil of the turbine section of FIG. 2 having a radial metering hole connecting a radially extending passage to an axially extending passage of a tip flag cooling channel.

FIG. 5 is a cross-sectional view of blade 300. Blade 300 is substantially similar to blade 100 with a variation in the configuration of a metering orifice connecting the radially extending passage of the tip flag channel to the axially extending passage of the tip flag channel. Airfoil body 302, base region 304, tip 306, leading edge 308, trailing edge 310, platform 312, root portion 314, serpentine channel 316, tip flag channel 318 (including radially extending passage **318*a* and axially extending passage 318*b*), leading edge channel 320, trailing edge channel 322, first passage 324, second passage 326, final passage 328, end turns 330 and 332, walls 334, 336, 338, 340, 342, 344, and 345, metering orifice 346, and crossover holes 348 are shown. All elements, with the exception of metering orifice 346 and walls 342 and 344, are consistent with corresponding elements of blade 100 and described with respect thereto. Reference numbers have been increased by 200 for ease of comparison. Features not labelled are consistent with the corresponding features shown in FIG. 3** and discussed with respect thereto.

As illustrated in FIG. 5, wall 342, which defines an aft boundary of radially extending passage **318*a* of tip flag channel 318, has a radially outermost terminal end disposed radially inward of tip 306 such that a gap is formed between tip 306 and wall 342. Metering orifice 346 is an opening at a radially outer end of radially extending passage 318*a* of tip flag channel 318 defined between walls 342 and 344, the pressure side wall, and the suction side wall. Metering orifice 346 fluidly connects radially extending passage 318*a* with axially extending passage 318*b* of tip flag channel 318. In contrast to metering orifices 146 and 246, which direct cooling flow axially from radially extending passages 118*a* and 218*a*, metering orifice 346 is oriented to direct cooling flow radially outward toward tip 306. This configuration of metering orifice 346 can have the added benefit of providing impingement cooling to a back side of tip 206**.

Metering orifice 346 can be defined between protrusions 372, 374 extending axially from walls 342 and 344, respectively. Protrusions 372, 374 can be ridges extending fully across walls 342, 344 from the pressure side wall to the suction side wall. Protrusions 372, 374 can have any cross-sectional shape to promote cooling flow through metering orifice 346. Metering orifice 346 can be a slot defined between protrusions 372 and 374 and extending fully from the pressure side wall to the suction side wall. Metering orifice 346 has a cross-sectional area selected to provide a reduction in pressure from P2 to P3 to promote axially directed cooling flow through axially extending passage **318*b* of tip flag channel 318 and to discourage cooling flow exiting metering orifice 346 from entering final passage 328 of serpentine channel 316 and being conveyed inboard through a portion of final passage 328. The cross-sectional area of metering orifice 346 can be defined by a minimum distance between protrusions 372 and 374 that extends axially from walls 342 and 344**, respectively.

Metering orifice 346 is spaced radially inward from tip 306. Protrusion 372 can be disposed at the terminal end of wall 342 or spaced radially inward of but adjacent to the terminal end of wall 342. Protrusions 372 and 374 can be axially aligned. As illustrated in FIG. 5, wall 342 extends a height substantially equal to wall 338 and is axially aligned with wall 340. In other embodiments, it may be desirable to position the terminal end of wall 342 radially outward of walls 338 and 340 to help promote axial flow of cooling fluid from each of radially extending passage 318*a* and final passage 328 or serpentine channel 316 through axially extending passage 318*b* of tip flag channel 318. Locating metering orifice 346 closer to tip 306 may also improve impingement cooling of tip 306 adjacent to a corner formed by the intersection of wall 344 and tip 306. Metering orifice 346 can be shaped and oriented in various configurations to provide the described flow and temperature benefits.

Figure 6:
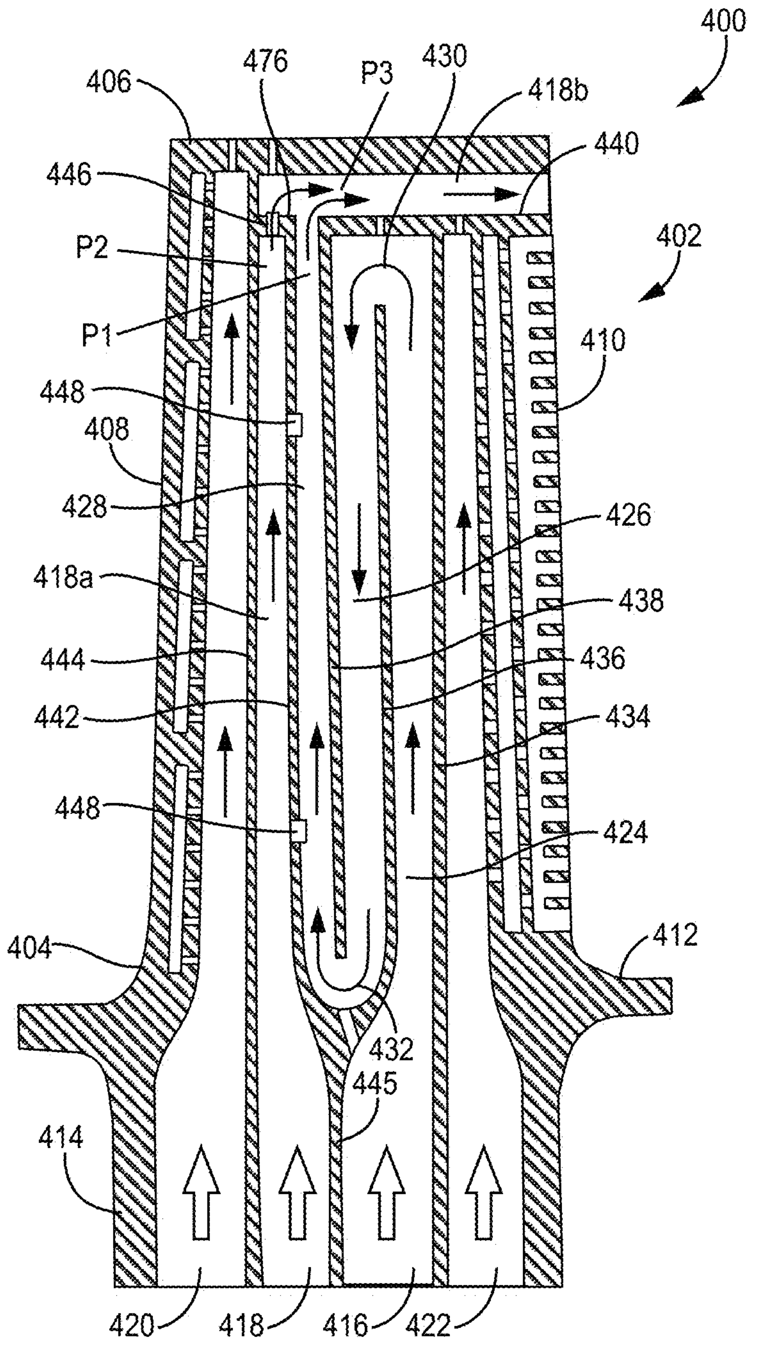
FIG. 6 is a cross-sectional view of yet another embodiment of an airfoil of the turbine section of FIG. 2 having radial wall-to-wall metering slot connecting a radially extending passage to an axially extending passage of a tip flag cooling channel.

FIG. 6 is a cross-sectional view of blade 400. Blade 400 is substantially similar to blade 100 with a variation in the configuration of a metering orifice connecting the radially extending passage of the tip flag channel to the axially extending passage of the tip flag channel. Airfoil body 402, base region 404, tip 406, leading edge 408, trailing edge 410, platform 412, root portion 414, serpentine channel 416, tip flag channel 418 (including radially extending passage 418*a* and axially extending passage 418*b*), leading edge channel 420, trailing edge channel 422, first passage 424, second passage 426, final passage 428, end turns 430 and 432, walls 434, 436, 438, 440, 442, 444, and 445 metering orifice 446, and crossover holes 448 are shown. All elements, with the exception of metering orifice 446 and walls 442 and 444, are consistent with corresponding elements of blade 100 and described with respect thereto. Reference numbers have been increased by 300 for case of comparison. Features not labelled are consistent with the corresponding features shown in FIG. 3 and discussed with respect thereto.

As illustrated in FIG. 6, a terminal end of radially extending passage 418*a* of tip flag channel 218 is defined by wall 476. Wall 476 extends axially aft from wall 444 to wall 442. Wall 476 joins walls 442, 444, the pressure side wall, and the suction side wall and defines a radial outermost boundary of radially extending passage 418*a* of tip flag channel 418. Metering orifice 446 is a hole through wall 476, fluidly connecting radially extending passage 418*a* with axially extending passage 418*b* of tip flag channel 418. Metering orifice 446 is oriented to direct cooling flow radially outward toward tip 406. This configuration of metering orifice 446 can have the added benefit of providing impingement cooling to the back side of tip 406. Metering orifice 446 can have a circular cross-sectional shape or any shape suitable to provide a desired cooling flow through metering orifice 446. Metering orifice 446 can be centered axially between walls 442 and 444 and/or can be centered between the pressure side wall and the suction side wall. In some embodiments, metering orifice 446 may be biased toward wall 442 or 444 and/or toward the pressure side wall or the suction side wall. Metering orifice 446 has a cross-sectional area selected to provide a reduction in pressure from P2 to P3 to promote axially directed cooling flow through axially extending passage 418*b* of tip flag channel 418 and to discourage cooling flow exiting metering orifice 446 from entering final passage 428 of serpentine channel 416 and being conveyed inboard through a portion of final passage 428.

Wall 476 is disposed radially inward of tip 406. As illustrated in FIG. 6, wall 476 can be axially aligned with wall 440. In other embodiments, it may be desirable to position wall 476 radially outward of wall 440 to help promote axial flow of cooling fluid from each of radially extending portion 418*a* and final passage 428 of serpentine channel through axially extending passage 418*b* of tip flag channel 418. Locating metering orifice 446 closer to tip 406 may also improve impingement cooling of tip 406 at a corner formed by the intersection of wall 444 and tip 406. Metering orifice 446 can be shaped and oriented in various configurations to provide the described flow and temperature benefits.

Each of the disclosed cooling circuits enables higher internal heat transfer in a final passage of a serpentine channel and relatively cool tip temperatures by providing a dedicated tip flag channel fluidly connected to the final passage of the serpentine channel and a metering orifice that connects a radially extending passage of the tip flag channel disposed adjacent to and forward of the serpentine channel to an axially extending passage of the tip flag channel. The axially extending passage of the tip flag channel provides a low-pressure sink and a location for cooling holes downstream of the last passage of the serpentine channel. The reduced pressure and cooling holes can pull additional fluid flow through and increase heat transfer in the serpentine channel, which, in turn, helps reduce a creep critical section average temperature. The metering orifice provides a pressure drop to encourage fluid flow from the radially extending passage of the tip flag channel axially aft through the axially extending passage of the tip flag channel as opposed to radially inward through the final passage of the serpentine channel. It will be understood by one of ordinary skill in the art that the disclosed airfoils and cooling circuits can include other features not discussed herein, including but not limited to cooling holes through the airfoil body (i.e., pressure or suction side walls) from the tip flag channel (e.g., passages 118*a* and 118*b*) and the final passage of the serpentine channel (e.g., passage 128) to discharge cooling flow for film cooling of external airfoil surfaces.

The embodiments disclosed herein are intended to provide an explanation of the present invention and not a limitation of the invention. The present invention is not limited to the embodiments disclosed. It will be understood by one skilled in the art that various modifications and variations can be made to the invention without departing from the scope and spirit of the invention.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

An airfoil for a gas turbine engine, configured to extend in a radial direction relative to an engine axis from an inner diameter to an outer diameter, includes a body and a cooling circuit disposed in the body. The body has a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip. The cooling circuit includes a serpentine channel having a plurality of radially extending passages connected in flow series from a first passage to a final passage and a tip flag channel disposed adjacent to the serpentine channel. The tip flag channel includes a first tip flag passage disposed adjacent to the final passage of the serpentine channel and extending radially, and a second tip flag passage disposed between the serpentine channel and the tip and extending axially from the first tip flag passage and disposed in direct fluid communication with each of the first tip flag passage and the final passage of the serpentine channel.

The airfoil of the preceding paragraph can optionally include, additionally and/or alternatively, any one or more of the following features, configurations, and/or additional components:

An embodiment of the airfoil of the preceding paragraphs can further include a metering orifice fluidly connecting the first tip flag passage and the second tip flag passage.

In an embodiment of the airfoil of any of the preceding paragraphs, the metering orifice can have a cross-sectional area selected to reduce a pressure of a fluid flow exiting the first tip flag passage to a value equal to or less than a pressure of a fluid exiting the final passage of the serpentine channel.

In an embodiment of the airfoil of any of the preceding paragraphs, the metering orifice can be between the tip and a first wall separating the first tip flag passage and the final passage of the serpentine channel along a length of each of the first tip flag passage and the final passage.

In an embodiment of the airfoil of any of the preceding paragraphs, the metering orifice can extend from the pressure side wall to the suction side wall.

In an embodiment of the airfoil of any of the preceding paragraphs, the metering orifice can be a hole through a first wall separating the first tip flag passage and the final passage of the serpentine channel along a length of each of the first tip flag passage and the final passage, the first wall extending to the tip.

In an embodiment of the airfoil of any of the preceding paragraphs, the metering orifice can be disposed between radially extending walls defining the first tip flag passage and is configured to direct a cooling flow radially toward the tip.

In an embodiment of the airfoil of any of the preceding paragraphs, the metering orifice can extend from the pressure side wall to the suction side wall.

In an embodiment of the airfoil of any of the preceding paragraphs, the metering orifice can be a hole through an axially extending wall defining a radially outermost boundary of the first tip flag passage.

An embodiment of the airfoil of any of the preceding paragraphs can further include a first wall separating the first tip flag passage and the final passage of the serpentine channel along the length of each of the first tip flag passage and the final passage, and an orifice through the first wall providing fluid communication between the first tip wall passage and the final passage.

In an embodiment of the airfoil of any of the preceding paragraphs, the second tip flag passage can extend to the trailing edge.

An embodiment of the airfoil of any of the preceding paragraphs can further include a leading edge channel disposed forward of the first tip flag passage and fluidly separated from each of the first tip flag passage and the second tip flag passage.

An embodiment of the airfoil of any of the preceding paragraphs can further include a trailing edge channel disposed aft of the serpentine channel and fluidly separated from each of the serpentine channel and the tip flag channel.

A cooling circuit of an airfoil for a gas turbine engine includes a serpentine channel having a plurality of fluidly connected radially extending flow passages and a tip flag channel disposed adjacent to the serpentine channel. The tip flag channel includes a first tip flag passage extending radially and a second tip flag passage extending axially from a terminal end of the first tip flag passage, the second tip flag passage disposed radially outward of the serpentine channel. The second tip flag passage is in direct fluid communication with each of the first tip flag passage and a final passage of the serpentine channel.

The cooling circuit of the preceding paragraph can optionally include, additionally and/or alternatively, any one or more of the following features, configurations, and/or additional components:

An embodiment of the cooling circuit of the preceding paragraphs can further include a metering orifice fluidly connecting the first tip flag passage and the second tip flag passage, wherein the metering orifice has a cross-sectional area selected to reduce a pressure of a fluid flow exiting the first tip flag passage to a value equal to or less than a pressure of a fluid exiting the final passage of the serpentine channel.

In an embodiment of the cooling circuit of any of the preceding paragraphs, the metering orifice can be between a tip of the airfoil and a first wall separating the first tip flag passage and the final passage of the serpentine channel along a length of each of the first tip flag passage and the final passage.

In an embodiment of the cooling circuit of any of the preceding paragraphs, the metering orifice can be disposed through a first wall separating the first tip flag passage and the final passage of the serpentine channel along a length of each of the first tip flag passage and the final passage, the first wall extending to a tip of the airfoil.

In an embodiment of the cooling circuit of any of the preceding paragraphs, the metering orifice can be disposed between radially extending walls defining the first tip flag passage and is configured to direct a cooling flow radially toward the tip.

In an embodiment of the cooling circuit of any of the preceding paragraphs, the metering orifice can be a hole through an axially extending wall defining a radially outermost boundary of the first tip flag passage.

An embodiment of the cooling circuit of any of the preceding paragraphs can further include a first wall separating the first tip flag passage and the final passage of the serpentine channel along the length of each of the first tip flag passage and the final passage, and an orifice through the first wall providing fluid communication between the first tip flag passage and the final passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil for a gas turbine engine, the airfoil configured to extend in a radial direction relative to an engine axis from an inner diameter to an outer diameter and comprising:

a body having a base disposed at the inner diameter, a tip disposed at the outer diameter, a leading edge, a trailing edge, a pressure side wall extending between the leading edge and the trailing edge and between the base and the tip, and a suction side wall extending between the leading edge and the trailing edge and between the base and the tip; and a cooling circuit disposed in the body, the cooling circuit comprising:

a serpentine channel having a plurality of radially extending passages connected in flow series from a first passage to a final passage, wherein the first passage is fluidly connected to a first inlet;

a tip flag channel disposed adjacent to the serpentine channel, the tip flag channel comprising:

a first tip flag passage extending radially and disposed immediately adjacent to the final passage of the serpentine channel, wherein a first wall separates a full radial extent of the final passage from the first tip flag passage, and wherein the first tip flag passage is fluidly connected to a second inlet, the second inlet separated from the first inlet by a second wall;

a second tip flag passage disposed between the serpentine channel and the tip, the second tip flag passage extending axially from the first tip flag passage and in direct fluid communication with each of the first tip flag passage and the final passage of the serpentine channel; and a metering orifice fluidly connecting the first tip flag passage and the second tip flag passage, the metering orifice having a cross-sectional area less than a cross-sectional area of each of the first tip flag passage and the second tip flag passage and wherein the cross-sectional area of the metering orifice is selected to reduce a pressure of a fluid flow exiting the first tip flag passage to a value equal to or less than a pressure of a fluid exiting the final passage of the serpentine channel such that a cooling fluid is prevented from being ingested by the serpentine channel at an outlet of the final passage.

2. The airfoil of claim 1, wherein the metering orifice is between the tip and the first wall separating the first tip flag passage and the final passage of the serpentine channel along a length of each of the first tip flag passage and the final passage.

3. The airfoil of claim 1, wherein the metering orifice extends from the pressure side wall to the suction side wall.

4. The airfoil of claim 1, wherein the metering orifice is a hole through the first wall separating the first tip flag passage and the final passage of the serpentine channel along a length of each of the first tip flag passage and the final passage, the first wall extending to the tip.

5. The airfoil of claim 1, wherein the metering orifice is disposed between the first wall and a radially extending third wall, the first wall and the radially extending third walls defining the first tip flag passage, and wherein the metering orifice is configured to direct a cooling flow radially toward the tip.

6. The airfoil of claim 5, wherein the metering orifice extends from the pressure side wall to the suction side wall.

7. The airfoil of claim 5, wherein the metering orifice is a hole through an axially extending wall defining a radially outermost boundary of the first tip flag passage.

8. The airfoil of claim 1, wherein the second tip flag passage extends to the trailing edge.

9. The airfoil of claim 1, and further comprising a leading edge channel disposed forward of the first tip flag passage and fluidly separated from each of the first tip flag passage and the second tip flag passage.

10. The airfoil of claim 9 and further comprising a trailing edge channel disposed aft of the serpentine channel and fluidly separated from each of the serpentine channel and the tip flag channel.

11. The airfoil of claim 1, wherein the first wall separating the first tip flag passage from the final passage of the serpentine channel comprises a crossover hole configured to provide additional cooling fluid to the final passage of the serpentine channel.

12. A cooling circuit of an airfoil for a gas turbine engine, the cooling circuit comprising:

a serpentine channel having a plurality of fluidly connected radially extending flow passages including a first passage fluidly connected to a first inlet and a final passage;

a tip flag channel disposed adjacent to the serpentine channel and comprising:

a first tip flag passage extending radially and disposed immediately adjacent to the final passage of the serpentine channel, wherein a first wall separates a full radial extent of the final passage from the first tip flag passage, and wherein the first tip flag passage is fluidly connected to a second inlet, the second inlet separated from the first inlet by a second wall;

a second tip flag passage extending axially from a terminal end of the first tip flag passage, the second tip flag passage disposed radially outward of the serpentine channel, wherein the second tip flag passage is in direct fluid communication with each of the first tip flag passage and the final passage of the serpentine channel; and a metering orifice fluidly connecting the first tip flag passage and the second tip flag passage, the metering orifice having a cross-sectional area less than a cross-sectional area of each of the first tip flag passage and the second tip flag passage;

wherein the cross-sectional area of the metering orifice is selected to reduce a pressure of a fluid flow exiting the first tip flag passage to a value equal to or less than a pressure of a fluid exiting the final passage of the serpentine channel such that a cooling fluid is prevented from being ingested by the final passage of the serpentine channel.

13. The cooling circuit of claim 12, wherein the metering orifice is between a tip of the airfoil and the first wall separating the first tip flag passage and the final passage of the serpentine channel along a length of each of the first tip flag passage and the final passage.

14. The cooling circuit of claim 12, wherein the metering orifice is disposed through the first wall separating the first tip flag passage and the final passage of the serpentine channel along a length of each of the first tip flag passage and the final passage, the first wall extending to a tip of the airfoil.

15. The cooling circuit of claim 12, wherein the metering orifice is disposed between the first wall and a radially extending third wall, the first wall and the radially extending third walls defining the first tip flag passage, and wherein the metering orifice is configured to direct a cooling flow radially toward a tip of the airfoil.

16. The cooling circuit of claim 15, wherein the metering orifice is a hole through an axially extending wall defining a radially outermost boundary of the first tip flag passage.

* * * * *